United States Patent
Lee

[11] Patent Number: 5,405,167
[45] Date of Patent: Apr. 11, 1995

[54] COMBINED SUBFRAME AND FUEL TANK FOR USE IN AUTOMOBILES

[75] Inventor: Un K. Lee, Anyang, Rep. of Korea

[73] Assignee: Hyundai Motor Company, Seoul, Rep. of Korea

[21] Appl. No.: 183,950

[22] Filed: Jan. 21, 1994

[51] Int. Cl.⁶ ............................................. B60P 3/22
[52] U.S. Cl. ..................................... 280/830; 280/834
[58] Field of Search ............... 280/830, 831, 832, 833, 280/834; 180/311, 89.1; 296/188, 189, 187

[56] References Cited

U.S. PATENT DOCUMENTS

| | | | |
|---|---|---|---|
| 3,661,419 | 5/1972 | Mitamura et al. | 280/834 X |
| 4,087,101 | 5/1978 | Shimazaki et al. | 280/834 |
| 4,093,254 | 6/1978 | Ezaki | 280/783 |
| 4,098,520 | 7/1978 | Ezaki et al. | 280/784 |
| 4,223,899 | 9/1980 | Krieger | 280/834 |
| 4,283,067 | 8/1981 | Weber et al. | 280/834 |
| 4,416,461 | 11/1983 | Hayashi et al. | 280/834 |
| 4,444,373 | 4/1984 | Hayashi | 280/834 X |
| 4,469,340 | 9/1984 | Condet | 280/834 |
| 4,497,723 | 5/1984 | Shiratsuchi | 280/833 |
| 4,540,191 | 9/1985 | Hoch | 280/834 |
| 4,550,923 | 11/1985 | Ogawa et al. | 280/834 |
| 4,610,453 | 9/1986 | Collier | 280/834 |
| 4,909,530 | 3/1990 | Tsukada et al. | 180/296 |
| 4,919,226 | 4/1990 | Rana et al. | 280/830 X |
| 4,930,811 | 6/1990 | Tsukada et al. | 280/834 |
| 4,950,031 | 8/1990 | Mizunaga et al. | 296/189 |
| 5,110,177 | 5/1992 | Akio | 280/834 X |
| 5,114,184 | 5/1992 | Shimomura et al. | 280/784 |
| 5,174,628 | 12/1992 | Hayatsugu et al. | 296/188 |
| 5,195,780 | 3/1993 | Inoue et al. | 280/830 |

FOREIGN PATENT DOCUMENTS

| | | | |
|---|---|---|---|
| 547585 | 6/1993 | European Pat. Off. | 280/830 |
| 2929704 | 2/1981 | Germany | 280/834 |

*Primary Examiner*—Margaret A. Focarino
*Assistant Examiner*—Kevin Hurley
*Attorney, Agent, or Firm*—Birch, Stewart Kolasch & Birch

[57] ABSTRACT

A combined subframe and fuel tank for use in automobiles, includes a subframe having a seat disposed therein for tightly receiving an extension extending from a fuel tank, whereby the combined subframe and fuel tank form a composite product so as to occupy a small space in the automobile body.

4 Claims, 1 Drawing Sheet

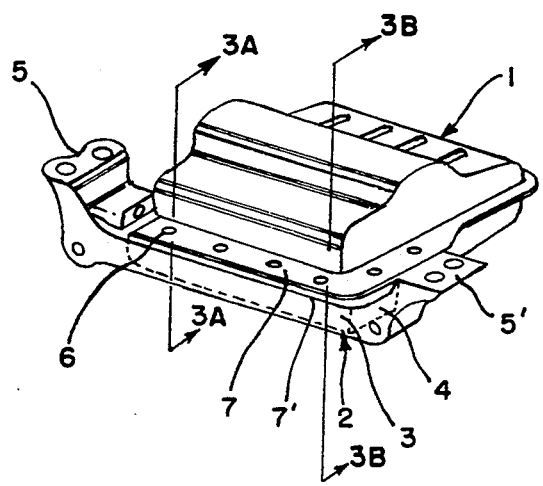
FIG.1
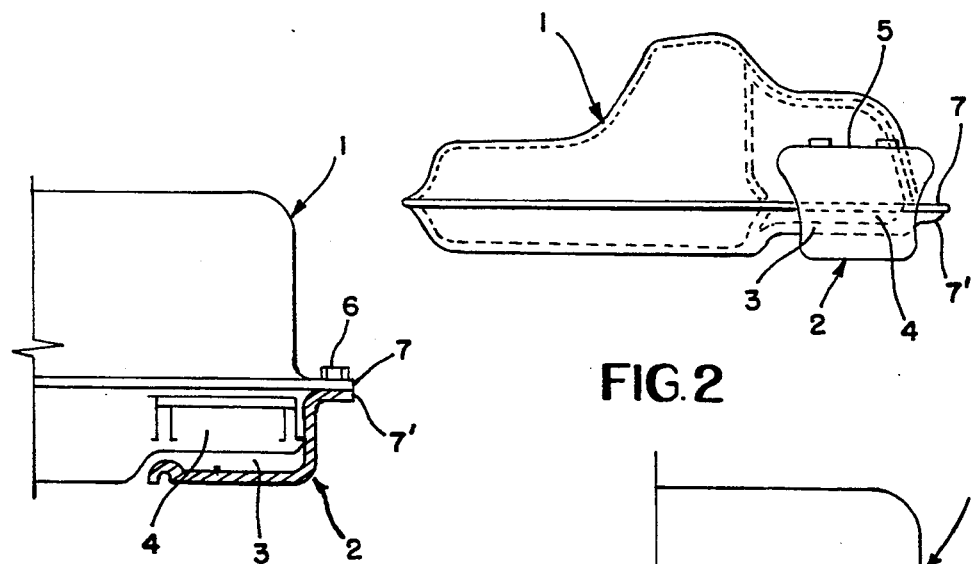
FIG.2
FIG.3(A)
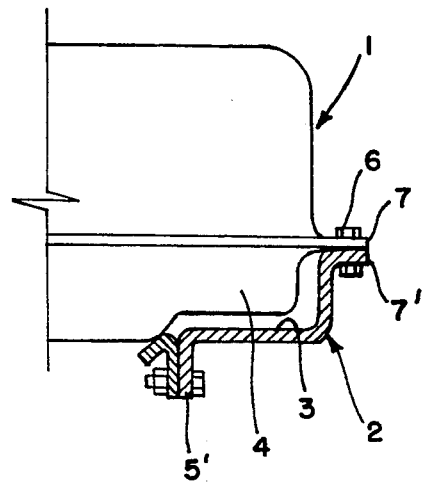
FIG.3(B)
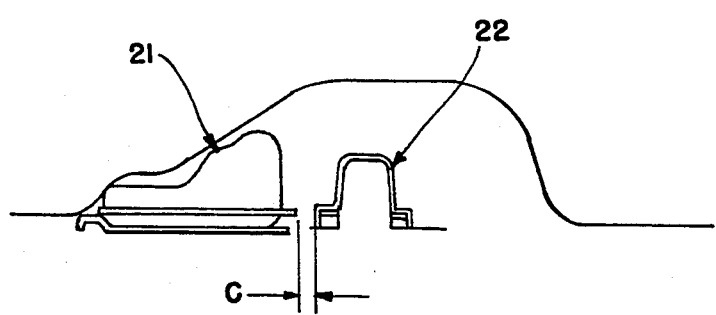
FIG.4 CONVENTIONAL ART

COMBINED SUBFRAME AND FUEL TANK FOR USE IN AUTOMOBILES

BACKGROUND OF THE INVENTION

1. Field of the Invention

The present invention relates to a combined subframe and fuel tank for use in automobiles and more particularly, a combined subframe and fuel tank so as to eliminate a spacer disposed between a conventional subframe and a conventional fuel tank.

2. Description of Related Art

Various types of subframes are well known in the art. Such subframes are separately integrated with a fuel tank. As shown in FIG. 4, one subframe 22 of such subframes is generally installed in close vicinity to a fuel tank 21 at a predetermined spacing C for improving safety against rear impact of automobiles. However, these subframes are separate from the fuel tanks and can occupy substantial space in the automobile, so that it is expensive to manufacture, complicated in structure, and difficult to assemble. Also, when a design of rear floor etc. is worked out taking into consideration the capacity of such a conventional fuel tank, all rear suspensions including suspension and such conventional subframe, and interior passenger space, the design is always worked out on a compromise line due to restrictions placed on their positions and spaces, so that a limit has been imposed upon the design. In addition, the conventional fuel tank and subframe are separate parts and each occupy one portion of a space respectively. Accordingly, the space occupied by the conventional fuel tank is used to fill fuel therein but the internal space of the conventional subframe is rendered useless. Such a conventional subframe thus occupies an unnecessary space. Due to such construction of the conventional fuel tank and subframe, space utilization is not maximized and the effects of a light or weight product and reduced cost are not achieved.

SUMMARY OF THE INVENTION

Accordingly, it is an object of the present invention to provide a combined subframe and fuel tank for use in automobiles, which eliminates the above problems encountered with a conventional subframe separated from a fuel tank.

Another object of the present invention is to provide a fuel tank tightly installed on a seat of a subframe at an extension of the fuel tank so as to eliminate a space between the fuel tank and subframe, so that the fuel tank is tightly integrated with the subframe as a composite product for convenient use in automobiles.

A further object of the present invention is to provide a combined subframe and fuel tank, which is simple in structure, inexpensive to manufacture, easy to use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a combined subframe and fuel tank for use in automobiles, which includes a subframe having a seat disposed thereon for tightly receiving an extension extending from a fuel tank, whereby the combined subframe and fuel tank forms a composite product so as to occupy a small size space in the automobile body.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of the combined subframe and a fuel tank for use in automobiles according to the present invention;

FIG. 2 is a side elevational view of the combined subframe and fuel tank for use in automobiles according to the present invention;

FIGS. 3(A) and 3(B) are partial side elevational views of the combined subframe and fuel tank for use in automobiles showing jointed conditions according to the present invention and FIG. 3(A) is shown on the line 3A—3A of FIG. 1 and FIG. 3(B) is shown on the line 3B—3B of FIG. 1; and FIG. 4 is a side elevational view of a conventional system of fuel tank and subframe for use in automobiles.

DESCRIPTION OF THE PREFERRED EMBODIMENTS

Referring now in detail to the drawings for the purpose of illustrating preferred embodiments of the present invention, the combined subframe and fuel tank for use in automobiles as shown in FIGS. 1, 2, 3(A) and 3(B), includes a fuel tank 1, having an extension 4 extending from the fuel tank 1 and a tank flange 7 disposed at a periphery of the fuel tank 1. The present invention further includes a subframe 2 having a seat 3 for tightly receiving the extension 4 of the fuel tank and a subframe flange 7' disposed at the periphery of subframe 2 for joining the flange 7 of the fuel tank frame 1 to the flange 7' of the subframe 2 by bolts 6 or a welding method, etc.

In FIG. 1, element 5 is a bracket derived from the subframe 2 for mounting the extended fuel tank to other portions of the vehicle. FIG. 3(B) shows an additional mounting bracket 5' positioned on an opposite side of subframe 2 from bracket 5.

Accordingly, the present invention has an advantage to maximize space utilization by installing the extension 4 of the fuel tank 1 on the seat 3 of the subframe 2 as shown in FIGS. 2, 3(A), and 3(B). Therefore, an unnecessary space which is occupied by installing the subframe 22 and the fuel tank 21 separately is avoided, and the fuel tank space can also be utilized to the utmost by forming the extension 4, so that (1) a design can be worked out freely by increasing space utilization, (2) package performance can be improved by enlarging an indoor passenger space, (3) manufacturing cost is reducible by integrating parts, and (4) the product is lighten in weight.

When an impact takes place, a body side member is pushed, the subframe 2 for a suspension installed therein is also pushed together therewith, the fuel tank 1 located beneath the rear seat is thereby struck and the fuel tank 1 is likely to suffer damage but the integrated subframe of the present invention is pushed together with the fuel tank 1 and is free from being damaged. Accordingly, it effectively improves not only product quality but also safety against rear impact. Also, the present invention provides the subframe 2 integrated with the fuel tank, which utilizes the space occupied by the subframe 2 for installation of the fuel tank 1, thereby maximizing space utilization, producing a lighter product, and reducing its cost by making it possible to install the fuel tank in the space of the subframe 2 to be installed on the one side thereof, or by hermetically sealing the internal space of the subframe 2 to fill fuel therein or by reinforcing the structural strength of the fuel tank 1 to enable it to function as a subframe.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combined subframe and fuel tank for use in automobiles, comprising:

a subframe including a seat portion formed therein and a subframe flange disposed around a substantial outer perimeter of said subframe such that said seat portion is independently provided with respect to the subframe flange;

a fuel tank including an extension portion, the extension portion of said fuel tank being supported by the seat of said subframe, said fuel tank further including a fuel tank flange formed around a substantial outer perimeter thereof such that said extension portion is independently provided with respect to the fuel tank flange; and means for joining said subframe flange to the fuel tank flange so as to tightly support the extension portion of the fuel tank on said seat of the subframe.

2. The combined frame and fuel tank of claim 1, wherein said means for joining is by bolting.

3. The combined frame and fuel tank of claim 2, wherein said means for joining is by welding.

4. The combined frame and fuel tank of claim 1, further comprising at least one mounting bracket provided on said subframe to mount said subframe to external components.

* * * * *